United States Patent [19]
Miazgowicz

[11] Patent Number: 6,155,223
[45] Date of Patent: Dec. 5, 2000

[54] DISTRIBUTION RESERVOIR FOR AN INTERNAL COMBUSTION ENGINE

[75] Inventor: Keith Daniel Miazgowicz, Dearborn, Mich.

[73] Assignee: Ford Global Technologies, Inc., Dearborn, Mich.

[21] Appl. No.: 09/257,654

[22] Filed: Feb. 25, 1999

[51] Int. Cl.[7] .................................................. F02M 25/06
[52] U.S. Cl. ................ 123/184.35; 123/572; 123/568.17
[58] Field of Search .......................... 123/184.24–184.26, 123/184.34–184.36, 184.42–184.44, 184.47–184.49, 568.17, 572

[56] References Cited

U.S. PATENT DOCUMENTS

| | | |
|---|---|---|
| 4,782,797 | 11/1988 | Kurahashi ........................ 123/184.35 |
| 4,811,697 | 3/1989 | Kurahashi ........................ 123/184.35 |
| 4,926,802 | 5/1990 | Morris et al. . |
| 5,005,536 | 4/1991 | Suzuki et al. . |
| 5,088,454 | 2/1992 | Washizu et al. . |
| 5,267,543 | 12/1993 | Novak et al. . |
| 5,379,735 | 1/1995 | Ma . |
| 5,408,962 | 4/1995 | Tallio et al. . |
| 5,441,023 | 8/1995 | Ma . |
| 5,490,488 | 2/1996 | Aversa et al. . |
| 5,492,093 | 2/1996 | Rygiel . |
| 5,535,717 | 7/1996 | Rygiel . |
| 5,638,785 | 6/1997 | Lee . |
| 5,657,727 | 8/1997 | Uchida ............................. 123/184.34 |
| 5,740,778 | 4/1998 | Corcoran et al. . |
| 5,762,036 | 6/1998 | Verkleeren . |
| 5,954,021 | 9/1999 | Yuunaga ........................... 123/184.42 |

*Primary Examiner*—Marguerite McMahon
*Attorney, Agent, or Firm*—Jerome R. Drouillard

[57] ABSTRACT

An intake manifold and method for supplying EGR are provided for a multi-cylinder internal combustion engine. The manifold is attached to a cylinder head. The manifold includes a plurality of intake runners for conducting air to a plurality of intake ports formed in the cylinder head. An intake plenum communicates with the intake runners. A secondary gas reservoir is provided in the manifold for communication of secondary gas to the plenum.

23 Claims, 4 Drawing Sheets

DISTRIBUTION RESERVOIR FOR AN INTERNAL COMBUSTION ENGINE

FIELD OF THE INVENTION

The present invention relates to a system and method for secondary gas introduction, including but not limited to EGR, PCV, EVAP and/or idle air, into the air induction system for a multi-cylinder internal combustion engine, and more particularly to a reservoir for introducing secondary gas into the induction system.

BACKGROUND OF THE INVENTION

U.S. Pat. No. 5,590,488, assigned to the assignee of the prevent invention, which is incorporated herein by reference ('488 patent), describes an intake manifold having an Exhaust Gas Recirculation (EGR) passage formed therein extending generally parallel to a cooling passage formed in the manifold. The EGR flow in the '488 patent is considered ported because EGR flows through secondary EGR passages extending from the EGR supply passage to individual runners in the intake manifold.

In an EGR system according to the '488 patent, the EGR ports are provided in close proximity to the cylinder head. The EGR ports are provided within the individual intake runners, which results in communication between the ports. Such communication short circuits a tuned induction system, resulting in a degradation of engine performance and can provide for unequal distribution of EGR. This unequal distribution can also affect engine performance and emissions because the EGR is not properly controlled between cylinders. This makes it difficult to control the EGR to ensure smooth running of the engine.

U.S. Pat. Nos. 5,535,717 and 5,492,093 provide a system for introducing EGR into the an air induction system. These patents provide introduction of EGR within a balance tube, or into one of the runners, or a primary runner. This system does not promote equal distribution or mixing, as air is typically stagnant in the primary runner unless balance tube valve and the intake valves for the cylinders are open, and therefore distribution of the EGR is uneven between the cylinder banks. As described above, this unequal distribution may produce undesirable operation of the vehicle. A valve for such a balance tube is open normally in mid-range operation, such as between approximately 3000 and 4500 RPM. Thus, outside this range (at low speed or high speed operation), the balance valve is closed and the EGR gas is not properly mixed, and therefore an Inefficient, unequal cylinder bank distribution exists.

It would therefore be desirable to provide an EGR system which is balanced between the cylinders of a multi-cylinder engine and which provides proper mixing of the recirculated exhaust gas with the intake air at separate or coincidental reservoirs.

SUMMARY OF THE INVENTION

Accordingly, to overcome the EGR and other gas balance and mixing problems of an induction system from the prior art, a novel intake manifold is provided for a multi-cylinder internal combustion engine. The manifold is attached to a pair of cylinder heads. The manifold includes a plurality of intake runners for conducting air and fuel to a plurality of intake ports formed in the cylinder heads. A pair of intake plenums communicate with the plurality of intake runners. Each of the runners supply one of the cylinder heads. A secondary gas supply reservoir is provided in the manifold for introduction of secondary gas to the intake system.

Advantages of the present design include proper distribution and mixing of additional gases introduced into the intake system, including idle air, PCV and EVAP and other fluids at separate or coincidental supply reservoirs.

DETAILED DESCRIPTION OF THE PREFERRED EMBODIMENTS

Figure 1:
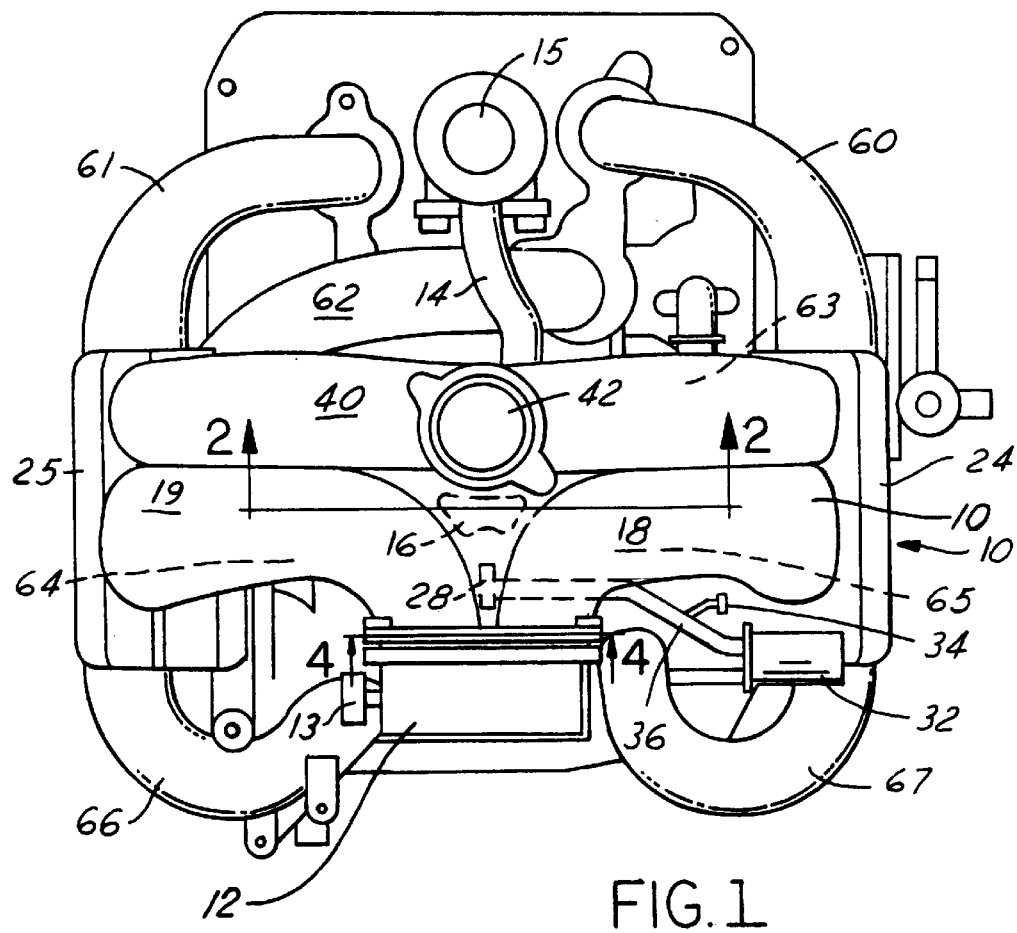
FIG. 1 is a schematic plan view of an engine including an intake manifold according to the present invention.

As shown in the Figures, and particularly FIG. 1, an intake manifold 10 is shown having a provision for mounting a throttle body 12 thereto. The throttle regulates the flow of a primary air flow gas, which is defined as the induction air brought into the manifold through the throttle body from ambient. The Throttle body 12 comprises a valve which is adjusted using a throttle adjustment means 13 as known to one skilled in the art, such as a cable or electronic adjuster.

Figure 7:
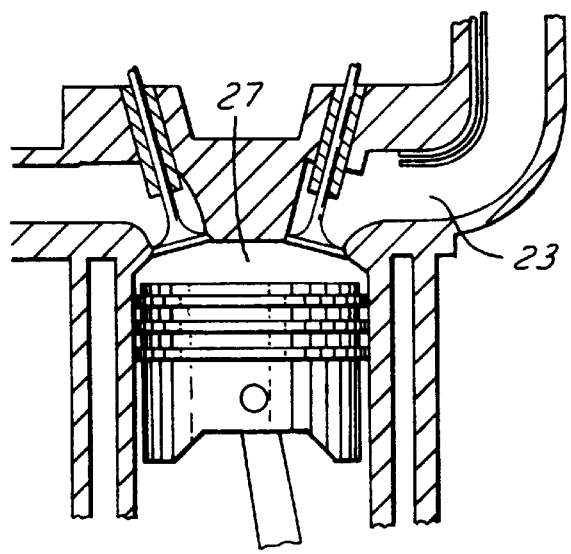
FIG. 7 is a schematic representation of a partial cross sectional view through a combustion chamber in an internal combustion engine.

The manifold includes a plurality of primary runners 60, 61, 62, 63, 64, 65, 66 and 67. In the embodiment shown in FIG. 1, five of eight primary runners 60, 61, 62, 66, 67 are visible for an eight-cylinder engine. The primary runners 60–67 distribute gases, including the primary air flow gas and secondary gases, to the intake ports. A representative intake port is illustrated in FIG. 7 at 23, and is provided in the heads 30, 31 of an internal combustion engine 28 to provide intake air to a combustion chamber 27. The present invention is applicable to a port fuel injection engine as well as a direct injection engine, and therefore the detail of the injector and spark plug positioning are not illustrated in FIG. 7.

Figure 2:
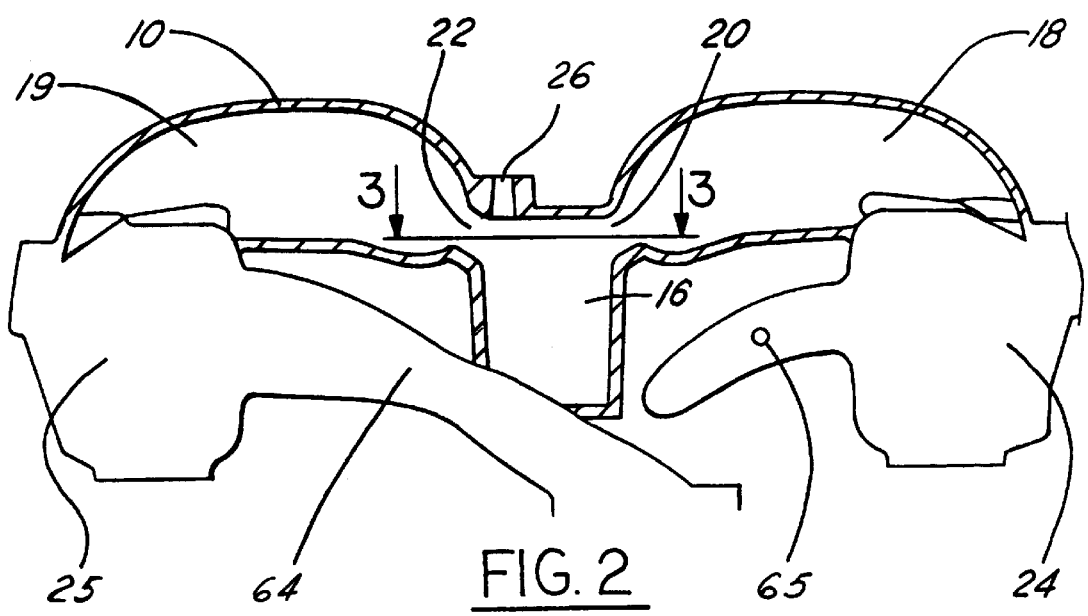
FIG. 2 is a partial cross-section through the manifold of FIG. 1.

The secondary gases include any other gas introduced into the induction system downstream of the throttle body. These gases typically require mixing within the induction system to provide equal cylinder-to-cylinder distribution and thereby promote smooth operation of the engine and to improve the emissions therefrom. The present invention is directed at providing a manifold and a method enabling such mixing and nearly equal distribution. The secondary gases include, but are not limited to, recirculated exhaust gas (EGR), EVAP, idle air and PCV. In a preferred embodiment, EGR is introduced into the manifold 10 through a tube 14. A known valve 15 for EGR regulates the flow of the exhaust gas introduced into the manifold 10. The EGR is fed into a reservoir 16 in the manifold 10 as is shown in FIG. 2.

As intake air is demanded by the engine through the secondary intake runners 18, 19, exhaust gas is drawn from the reservoir 16 through a pair of orifices 20, 22 provided in the manifold 10 leading between the runners 18, 19 and the reservoir 16. In this mariner, the exhaust gas is stored in the reservoir 16 and provided early in the intake system soon after the throttle 12 upon demand. When demand warrants, the EGR is thus drawn from the reservoir 16 and distributed to the secondary intake runners 18, 19 for introduction to the plenums 24, 25, then to primary runners 60–67 and ultimately into the cylinders (not shown) through a plurality of intake ports (not shown). This early introduction into the manifold 10 near the throttle 12 enables mixing within the manifold 10 and nearly equal distribution to all of the cylinders. The throttling of the gas at the throttle causes a venturi effect at the reservoir and sucks the secondary gas from the reservoir for mixing within the intake manifold prior to the air/fuel/secondary gas mixture being pulled into a primary runner. In a similar manner, when the throttle is closed and idle air is introduced into the intake manifold, the idle air draws the secondary gases from the reservoir.

The mixing minimizes any performance degradation due to short circuiting a tuned induction system, whereas introduction elsewhere in the induction system may result in unequal distribution and therefore the combustion in a particular cylinder may not be the same as other cylinders due to varying gas mixtures. This may result in poor performance, a rough feel, or unacceptable emissions. As understood by one skilled in the art and therefore not described in detail here, a tuned induction system is short-circuited using a balance tube 40 and balance tube communication valve 42 to tune the intake system and thereby improve the performance of the induction system and engine performance. The tuning principle and examples thereof are described in U.S pat. Nos. 5,408,962 and 5,638,785, assigned to the assignee of the present invention and which are incorporated herein by reference in their entirety.

Additional gases, such as Positive Crankcase Ventilation (PCV), Evaporative Emissions (EVAP), idle air, alternate fuels such as CNG, LPG, performance enhancing fuels and/or other gases may likewise be introduced into the manifold 10 within the reservoir 16 or a second reservoir 28 for distribution as described above. As illustrated in FIG. 2, PCV is introduced to the reservoir 16 through a second port 26 and thereby equally distribute this supply of PCV to the secondary intake runners 18, 19 in a manner similar to that described above for the EGR.

Figure 3:
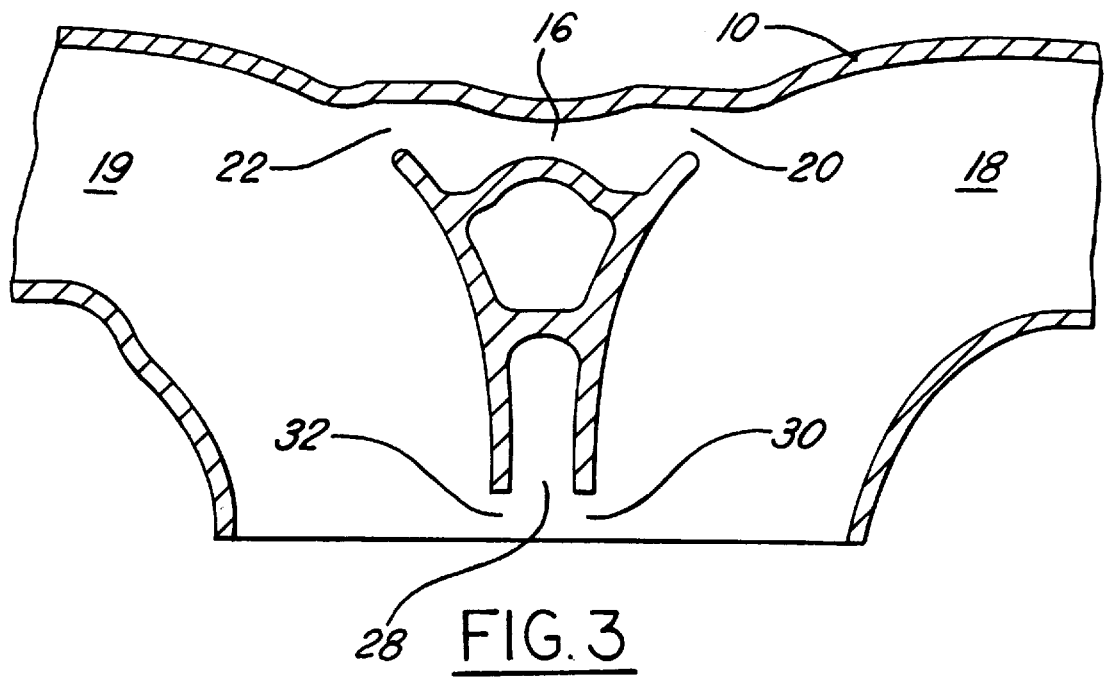
FIG. 3 is a partial cross-section of the intake manifold of FIG. 1, as indicated in FIG. 2.

As shown in FIG. 3, a preferred embodiment includes a second reservoir 28 provided for the idle air and EVAP. As shown in FIG. 1, an idle air valve 32 controls the flow of idle air to the reservoir 28 through a conduit 36. EVAP is introduced to the conduit 36 and to the reservoir 28 at a connection 34 provided therefore. Idle air is introduced through the throttle 12 to a port 38 in the manifold 10. The idle air is then routed to the valve 32 and introduced to the reservoir 28 as described above. In this embodiment, the first reservoir 16 for the PCV and EGR is provided in close proximity to the second reservoir 28 and therefore the distribution of these gases is provided in a manner as described above. Furthermore, although not shown here, one skilled in the art will appreciate that EGR, PCV, EVAP or idle air may also be supplied in either one of the reservoirs 16 and 28 and/or in other separate reservoirs (not shown) for mixing and nearly equal distribution to the secondary intake runners 18, 19, as demanded by the engine.

Figure 4:
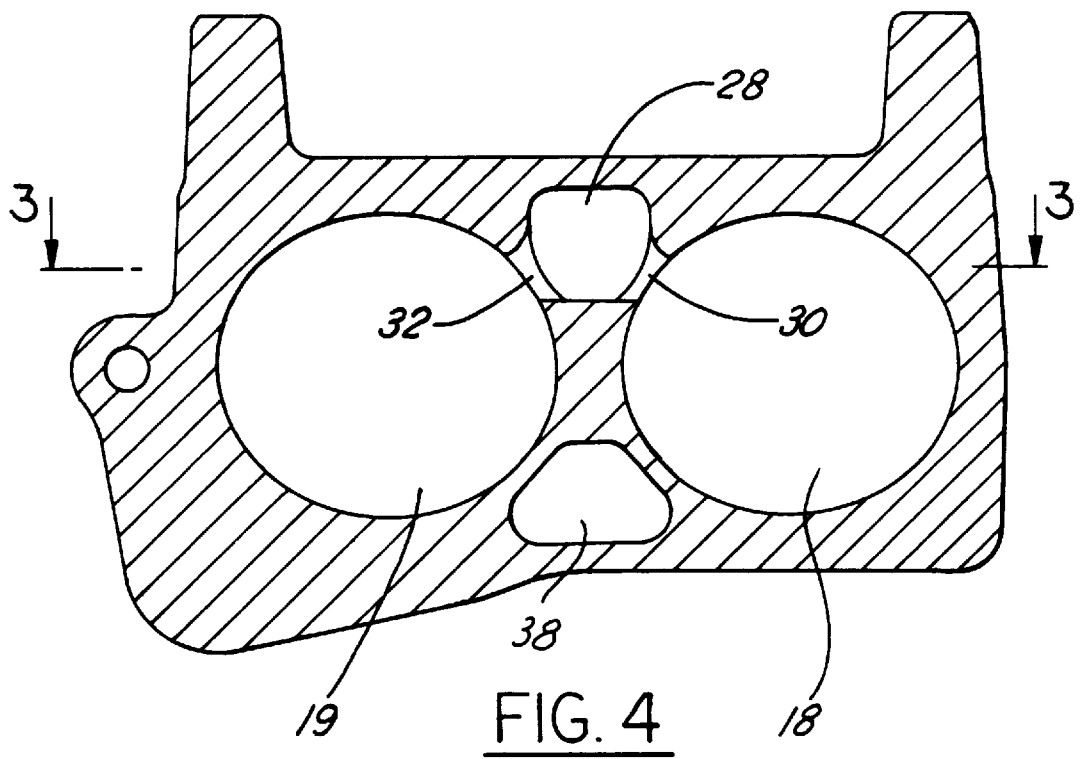
FIG. 4 is a partial cross-section through the intake manifold shown in FIG. 1.
Figure 5:
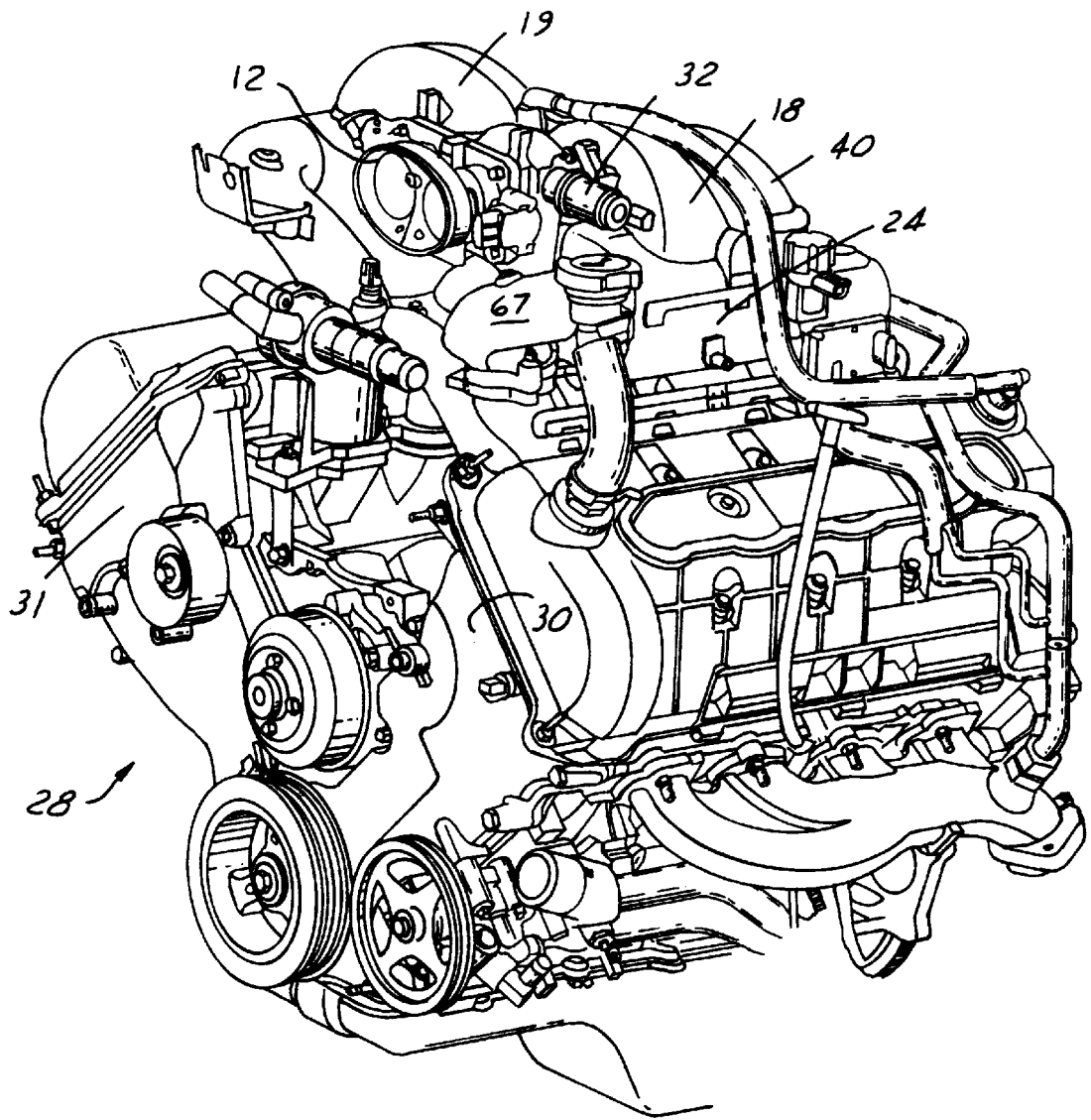
FIG. 5 is an isometric frontal view of an engine with a manifold according to the present invention.
Figure 6:
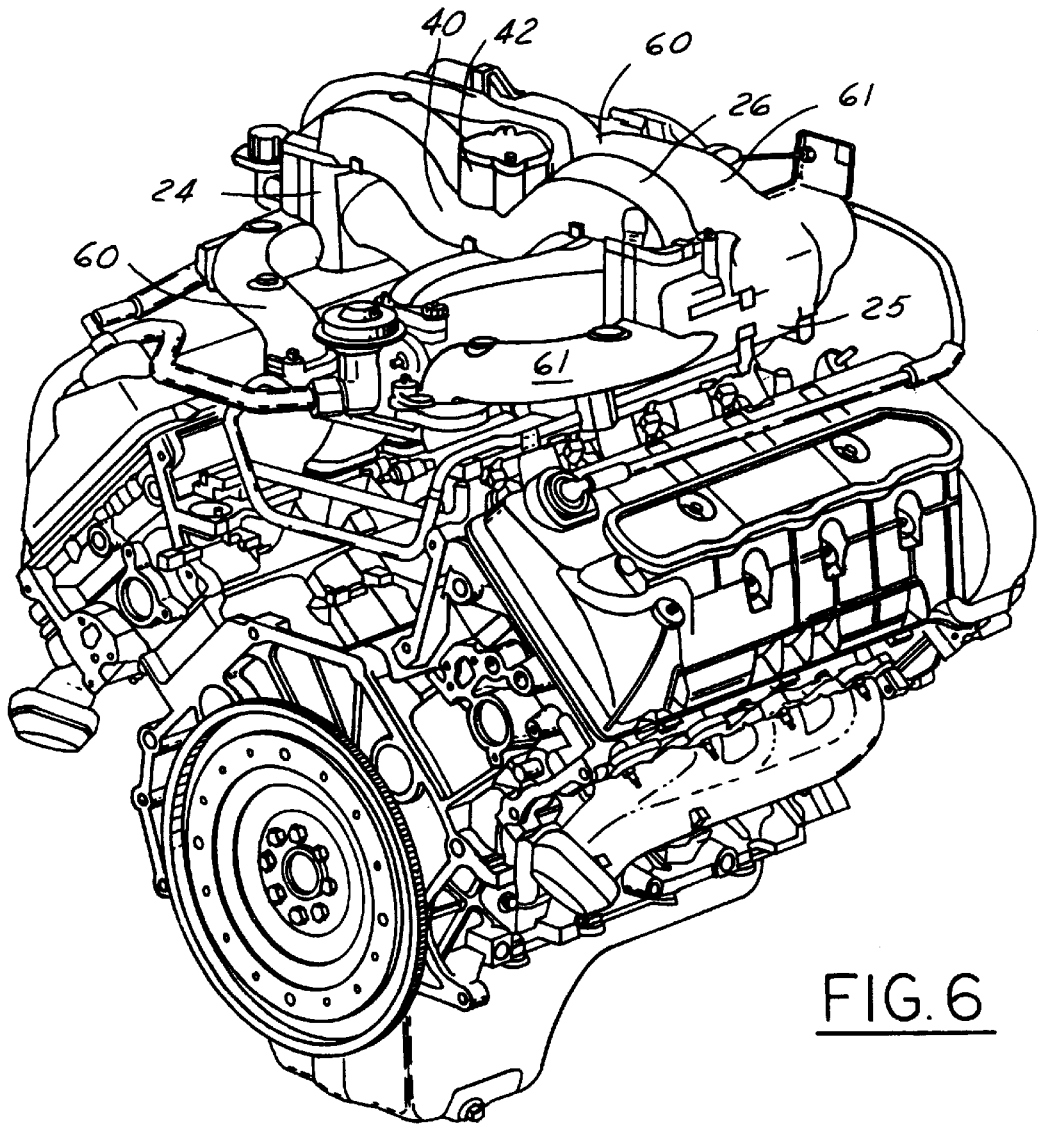
FIG. 6 is an isometric rear view of the engine of FIG. 5.

As shown in the embodiment of FIG. 4, the second reservoir 28 distributes EVAP to the secondary intake runners 18, 19 through orifices 30, 32 in a manner similar to the gas distribution from first reservoir 16, as described above. As is further described above, the reservoirs 16, 28 are positioned adjacent and downstream of the throttle body 12. Thus, the reservoirs 16, 28 store the gases until demand from the engine draws the gases from the reservoirs into the secondary intake runners 18, 19, as demanded by the engine, and is therefore distributed to the cylinders in an equal manner.

While the invention has been shown and described in its preferred embodiments, it will be clear to those skilled in the art to which it pertains that many changes and modifications may be made thereto without departing from the scope of the invention. For example, although the invention has been generally described with respect to an engine having an intake system conveying air and fuel to the intake ports of the cylinder heads, a direct injection engine may similarly utilize the invention. Furthermore, the present invention can likewise be applied to: a single bore throttle body with single plenum, single bore throttle body with multiple plenums, dual bore throttle body with single plenum, dual bore throttle body with multiple plenums (illustrated in the Figures) providing the advantage of minimizing induction tuning loses by introducing the secondary emissions gasses as far away from the cylinder ports as packaging will permit. One skilled in the art appreciates that although a v-type engine is illustrated in the figures, this disclosure is directed at other engine configurations, not described here in specific detail.

While the invention shown herein has discussed the distribution of EGR, EVAP, PCV and idle air, one skilled in the art will further realize that the present invention is directed at the equal distribution and mixing of any secondary gas, including but not limited to alternative fuels (including CNG, LPG, performance enhancing fuels., etc.). One planning to introduce such fuels could also incorporate versions of my reservoir to provide equal cylinder-to-cylinder distribution in multi-cylinder engines. One skilled in the art appreciates that primary air flow gas is typically defined as induction air brought into throttle body from ambient surroundings, and secondary gasses are typically defined as any other gas introduced downstream of the throttle body which requires cylinder-to-cylinder distribution for, but not limited to, engine performance or emission requirements.

While the forms of the invention shown and described herein constitute the preferred embodiments of the invention; they is not intended to illustrate all possible forms thereof. The words used are words of description rather than of limitation, and various changes may be made from that which is described here without departing from the spirit and scope of the invention.

What is claimed is:

1. An intake manifold for a multi-cylinder reciprocating internal combustion engine having a cylinder block with a cylinder head mounted thereto, said manifold comprising:

a plurality of primary intake runners for conducting air and fuel to a plurality of intake ports formed in the cylinder heads;

at least one intake plenum communicating with said plurality of intake a secondary gas supply reservoir provided in said manifold for distribution of a secondary gas to said at least one plenum; and at least one secondary intake runner for communicating said secondary gas between said reservoir and said at least one plenum.

2. An intake manifold according to claim 1, further comprising said secondary gas supply reservoir being provided in said manifold adjacent a throttle body attached to said manifold, said reservoir being downstream of said throttle body.

3. An intake manifold for a multi-cylinder reciprocating internal combustion engine having a cylinder block with a cylinder head mounted thereto, said manifold comprising:

a plurality of intake runners for conducting air and fuel to a plurality of intake ports formed in the cylinder heads;

an intake plenum communicating with said plurality of intake runners;

a secondary gas supply reservoir provided in said manifold for distribution of a secondary gas to said plenum, said secondary gas supply reservoir being provided in said manifold adjacent a throttle body attached to said manifold, said reservoir being downstream of said throttle body; and a secondary intake runner for communicating said secondary gas between said reservoir and said intake plenum.

4. An intake manifold as claimed in claim 2, further comprising said secondary gas reservoir being integrally formed in said manifold.

5. An intake manifold according to claim 2, further comprising one of an exhaust gas recirculation supply, a PCV supply, an idle air supply, an EVAP supply, and an alternative fuel supply in communication with said reservoir.

6. An intake manifold according to claim 3, further comprising one of an exhaust gas recirculation supply, a PCV supply, an idle air supply, an EVAP supply, and an alternative fuel supply in communication with said reservoir.

7. An intake manifold according to claim 3, further comprising said reservoir being integrally formed in said manifold.

8. An intake manifold according to claim 2, wherein the secondary gas is drawn into the manifold when one of said throttle body and idle air bypass valve is opened to supply air to the engine.

9. An intake manifold according to claim 6, wherein secondary gas is drawn into the secondary intake runners when said throttle body is opened to supply air to the engine.

10. A method of supplying secondary gas to a plenum in a manifold of a multicylinder engine, the manifold supplying fluids to a plurality of combustion chambers in said engine, the manifold further having a throttle body attached thereto, the method comprising:

providing a secondary gas reservoir in said manifold downstream from said throttle body;

supplying a secondary gas to said reservoir;

distributing the secondary gas to a plenum as air is drawn through said throttle body into said manifold, said plenum being in further fluid communication with a plurality of intake runners in said manifold; and communicating the secondary gas between the reservoir and the plenum.

11. A method according to claim 10, wherein the secondary gas is drawn from the reservoir through a venturi effect.

12. A method according to claim 11, further comprising the step of mixing the secondary gas with intake air supplied through said throttle body prior to communication of said secondary gas into said intake runners.

13. A method of supplying secondary gas to a plenum in a manifold of a multicylinder engine, the manifold supplying fluids to a plurality of combustion chambers in said engine, the manifold further having a throttle body attached thereto, the method comprising:

providing a secondary gas reservoir in said manifold downstream from said throttle body;

supplying a secondary gas to said reservoir; and distributing the secondary gas to a plenum as air is drawn through said throttle body into said manifold, said plenum being in further fluid communication with a plurality of intake runners in said manifold;

mixing the secondary gas with intake air supplied through said throttle body prior to communication of said secondary gas into said intake runners; and mixing the secondary gas with intake air supplied through said throttle body to a secondary runner prior to communication of said secondary gas into said plenum.

14. A method according to claim 13, wherein each of said combustion chambers has an intake port for communicating intake air therein, the method further comprising the step of preventing cross-port communication between the intake ports.

15. An intake manifold for a multi-cylinder reciprocating internal combustion engine having a cylinder block with a cylinder head mounted thereto, said manifold comprising:

a plurality of primary intake runners for conducting air and a secondary gas to a plurality of intake ports formed in the cylinder head;

a plurality of intake plenums communicating with the plurality of intake runners;

a secondary gas supply reservoir provided in said manifold for communication of secondary gas to said plenums; and a plurality of secondary intake runners for communicating said secondary gas between said reservoirs and said plenums.

16. An intake manifold according to claim 15, further comprising said secondary gas reservoir being formed in said manifold adjacent to and downstream from a throttle body attached to said manifold.

17. An intake manifold for a multi-cylinder reciprocating internal combustion engine having a cylinder block with a cylinder head mounted thereto, said manifold comprising:

a plurality of intake runners for conducting air and a secondary gas to a plurality of intake ports formed in the cylinder head;

a pair of intake plenums communicating with the plurality of intake runners;

a secondary gas supply reservoir provided in said manifold for communication of secondary gas to said plenums, said secondary gas supply reservoir being formed in said manifold adjacent to and downstream from a throttle body attached to said manifold; and a pair of secondary intake runners for communicating said secondary gas between said reservoir and said intake plenums.

18. An intake manifold according to claim 17, further comprising a balance tube for tuning the manifold between the plenums.

19. An intake manifold according to claim 18, further comprising one of an EGR port, a PCV port, an EVAP port, an idle air port, and an alternative fuel supply port communicating with said reservoir.

20. An intake manifold according to claim 19, further comprising said reservoir being formed in said manifold adjacent a throttle body attached to said manifold.

21. An intake manifold according to claim 20, wherein the secondary gas is drawn into the secondary runners when one of said throttle body and idle air bypass valve is opened to supply air to the engine.

22. An intake manifold according to claim 21, wherein the engine comprises a v-type engine having a pair of cylinder banks and each secondary runner and plenum is associated with a respective one of said banks, and wherein said reservoir communicates with each of said secondary runners.

23. An intake manifold according to claim 22, wherein said reservoir comprises a first reservoir for communicating a first one of said secondary gases and a second reservoir is provided in said manifold adjacent said first reservoir for communication of a second of said secondary gases to said plenums.

* * * * *